United States Patent
Choi et al.

(10) Patent No.: US 10,083,115 B2
(45) Date of Patent: Sep. 25, 2018

(54) MEMORY CONTROLLER AND DATA STORAGE APPARATUS INCLUDING THE SAME

(71) Applicant: SK hynix Inc., Icheon-si, Gyeonggi-do (KR)

(72) Inventors: Won Ha Choi, Icheon-si (KR); Ki Joon Chang, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 5 days.

(21) Appl. No.: 15/269,111

(22) Filed: Sep. 19, 2016

(65) Prior Publication Data
US 2017/0300411 A1    Oct. 19, 2017

(30) Foreign Application Priority Data
Apr. 19, 2016 (KR) .................. 10-2016-0047347

(51) Int. Cl.
*G06F 12/00* (2006.01)
*G06F 12/06* (2006.01)
G06F 13/00 (2006.01)
G06F 13/28 (2006.01)

(52) U.S. Cl.
CPC ...... *G06F 12/06* (2013.01); *G06F 2212/1016* (2013.01)

(58) Field of Classification Search
CPC .......................... G06F 12/06; G06F 2212/1016
See application file for complete search history.

(56) References Cited

U.S. PATENT DOCUMENTS

| | | | | |
|---|---|---|---|---|
| 5,297,271 | A * | 3/1994 | Bhayani | G09G 5/393 345/534 |
| 5,864,505 | A * | 1/1999 | Higuchi | G11C 7/1075 365/189.04 |
| 5,917,839 | A * | 6/1999 | Hashimoto | H03M 13/098 714/718 |
| 6,725,355 | B1 * | 4/2004 | Imamura | G06F 9/30101 712/23 |
| 9,292,425 | B2 * | 3/2016 | Choi | G06F 12/00 |
| 2006/0101152 | A1 * | 5/2006 | Yeh | H04L 41/142 709/231 |
| 2006/0282752 | A1 * | 12/2006 | Kuroda | G06F 12/0215 714/785 |
| 2015/0178187 | A1 | 6/2015 | Sheffler et al. | |

* cited by examiner

*Primary Examiner* — Mark A Giardino, Jr.
(74) *Attorney, Agent, or Firm* — William Park & Associates Ltd.

(57) ABSTRACT

A data storage apparatus, memory controller, and or method operation method may be disclosed. The memory controller may include an address generator configured to generate an operation target address and a destination address. The memory controller may be configured to output the operation target address and the destination address. The memory controller may include a data processor configured to receive the operation target address, read data by accessing the corresponding address of the operation target address, perform an operation on the read data, access the destination address, and write a result of the operation in the accessed destination address.

14 Claims, 6 Drawing Sheets

MEMORY CONTROLLER AND DATA STORAGE APPARATUS INCLUDING THE SAME

CROSS-REFERENCE TO RELATED APPLICATION

The priority of Korean patent application No. 10-2016-0047347 filed on 19 Apr. 2016, the disclosure of which is hereby incorporated in its entirety by reference, is claimed.

BACKGROUND

1. Technical Field

Embodiments of the present disclosure may generally relate to a data storage apparatus, and more particularly to a data storage apparatus relating to the minimization of the number of memory commands needed to operate data stored in a memory and re-storing the operation resultant data in the memory.

2. Related Art

A semiconductor memory device is implemented using a semiconductor material such as silicon (Si), germanium (Ge), germanium (Ge), gallium arsenide (GaAs), indium phosphide (InP), etc. Semiconductor memory devices are generally classified into a volatile memory device and a non-volatile memory device.

Data stored in a volatile memory device is lost when the power supply for the memory device is stopped. Volatile memory devices may be classified into a static RAM (SRAM), a dynamic RAM (DRAM), a synchronous DRAM (SDRAM), etc. On the other hand, data stored in a non-volatile memory device is not lost even when the power supply for the memory device is stopped. There are a variety of non-volatile memory devices such as a read only memory (ROM), a programmable read-only memory (PROM) device, an erasable programmable read-only memory (EPROM) device, an electrically erasable programmable read-only memory (EEPROM) device, a flash memory device, a phase change RAM (PRAM), a magnetic RAM (MRAM), a resistive RAM (RRAM), a ferroelectric RAM (FRAM), etc.

A plurality of commands are needed for such memory devices such that data stored in each memory can be read, operated, and re-stored in the memory using the plurality of commands. For example, if two data are summed and the summed result is stored in each memory, two read commands and a single write command are needed. Therefore, if a large number of operations (or calculations) are performed, system load of a host system configured to generate and manage such commands unavoidably increases.

Furthermore, the conventional art must generate respective commands separately from each other even when an address of a read command is identical to an address of a write command, such that a host system must transmit the same address to each memory two times, resulting in reduced system efficiency.

SUMMARY

In accordance with an aspect of the present disclosure, a data storage apparatus, memory controller, and or method operation method may be disclosed. The memory controller may include an address generator configured to generate an operation target address and a destination address. The memory controller may be configured to output the operation target address and the destination address. The memory controller may include a data processor configured to receive the operation target address, read data by accessing the corresponding address of the operation target address, perform an operation on the read data, access the destination address, and write a result of the operation in the accessed destination address.

DETAILED DESCRIPTION

Reference will now be made to embodiments of the present disclosure, examples of which are illustrated in the accompanying drawings. Wherever possible, the same reference numbers will be used throughout the drawings to refer to the same or like parts.

In association with the embodiments of the present disclosure, specific structural and functional descriptions are disclosed only for illustrative purposes, the embodiments of the present disclosure can be implemented in various ways without departing from the scope or spirit of the present disclosure.

In the description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

The terms used in the present application are merely used to describe specific embodiments and are not intended to limit the present disclosure. A singular expression may include a plural expression unless otherwise stated in the context.

Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

Various embodiments of the present disclosure may be directed to providing a memory controller and a data storage apparatus including the same that may substantially obviate one or more problems due to limitations and disadvantages of the related art.

An embodiment of the present disclosure may relate to a technology for minimizing the number of commands needed to operate data stored in a memory, such that load of a host is reduced and performance or throughput of a data storage apparatus may be improved.

Figure 1:
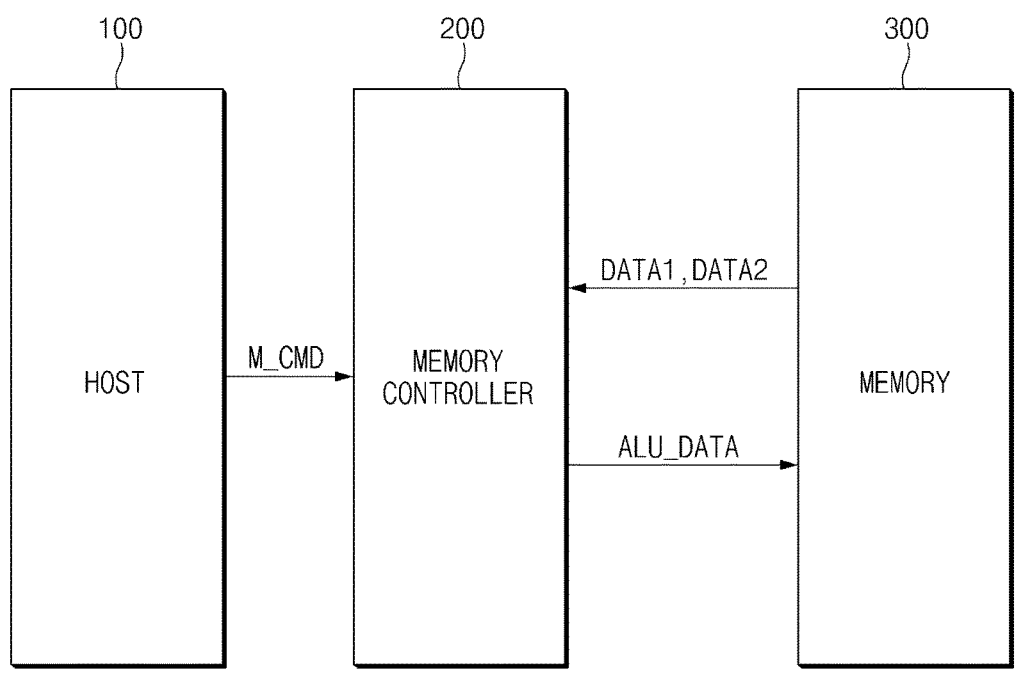
FIG. 1 is a block diagram illustrating a representation of an example of a semiconductor memory device according to an embodiment of the present disclosure.

FIG. 1 is a block diagram illustrating a representation of an example of a semiconductor memory device according to an embodiment of the present disclosure. In an embodiment, FIG. 1 may be a block diagram illustrating a representation of an example of a data storage apparatus.

Referring to FIG. 1, the semiconductor memory device may include a host 100, a memory controller 200, and a memory 300. In an embodiment, the data storage apparatus may include a host 100, a memory controller 200, and a memory 300.

The host 100 may generate a memory command (M_CMD) for requesting that an operation (e.g., addition) using data stored in the memory 300 be performed and the operation result be re-stored in the memory 300, and may transmit the memory command (M_CMD) to the memory controller 200. The host 100 may include not only at least one of two operation target addresses respectively indicating the positions of two operation target data but also an operation code for generating a new address using the at least one operation target address in the memory command (M_CMD), and may transmit the resultant memory command (M_CMD) to the memory controller 200.

The memory controller 200 may read operation target data (DATA1, DATA2) from the memory 300 upon receiving the memory command (M_CMD) from the host 100, may perform operation of the read operation target data (DATA1, DATA2), and may store the operation resultant data (ALU_DATA) in a destination address of the memory 300. For example, assuming that the memory command (M_CMD) received by the memory controller 200 includes only one of two operation target addresses for two operation target data (DATA1, DATA2), the memory controller 200 may generate another operation target address using the received address and the operation code contained in the memory command (M_CMD). In addition, the memory controller 200 may generate a destination address for storing the operation resultant data. For example, the memory controller 200 may use only one of two operation target addresses as a destination address, or may generate an address for a destination operation (hereinafter referred to as a destination operation address) by performing an operation on the two operation target addresses in response to the operation code and may use the generated destination operation address as a destination address.

The memory 300 may store operation target data and an operation resultant value of the operation target data.

Figure 2:
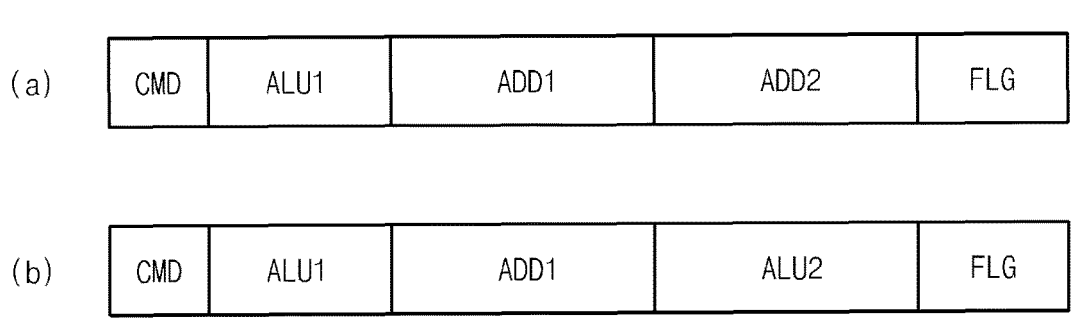
FIG. 2 is a schematic diagram illustrating representations of examples of structures of memory commands transferred from a host to a memory controller according to an embodiment of the present disclosure.

FIG. 2 is a schematic diagram illustrating representations of examples of structures of memory commands transferred from the host 100 to the memory controller 200 according to an embodiment of the present disclosure.

The memory command (M_CMD) illustrated in FIG. 2(a) may include a command code (CMD), a first operation code (ALU1), a first operation target address (ADD1), a second operation target address (ADD2), and a flag (FLG).

The command code (CMD) may be a value for determining a destination address in which operation resultant data will be stored. The destination address may be set to any one of the first operation target address (ADD1), the second operation target address (ADD2), and the destination operation address. The destination operation address may be a destination address acquired when the first operation target address (ADD1) and the second operation target address (ADD2) are operated in response to the first operation code (ALU1) contained in the memory command (M_CMD).

The first operation code (ALU1) may be a code value for generating a destination operation address. The first operation target address (ADD1) and the second operation target address (ADD2) are operated in response to the first operation code (ALU1), resulting in formation of a destination operation address.

The first operation target address (ADD1) may denote the position of first operation target data (DATA1) stored in the memory 300, and the second operation target address (ADD2) may denote the position of second operation target data (DATA2) stored in the memory 300.

The flag (FLG) may be a value for determining the second operation target address (ADD2), and may be decided by the host 100. For example, when deciding the flag (FLG), if the second operation target address (ADD2) is pre-stored in the memory command (M_CMD), the stored value may be used as the second operation target address (ADD2) without change (for example, FLG="0"). When deciding the flag (FLG), if the second operation target address (ADD2) is not stored in the memory command (M_CMD), a new address generated by the second operation code (ALU2) may be used as the second operation target address (ADD2) (for example, FLG="1").

The memory command (M_CMD) illustrated in FIG. 2(b) may include a command code (CMD), a first operation code (ALU1), a first operation target address (ADD1), a second operation code (ALU2), and a flag (FLG).

The command code (CMD), the first operation code (ALU1), the first operation target address (ADD1), and the flag (FLG) illustrated in FIG. 2(b) may be identical to those of FIG. 2(a).

The second operation code (ALU2) may be a code value for generating a new second target address using the first operation target address (ADD1). The second operation code (ALU2) may be stored in a specific position where the second operation target address (ADD2) of the memory command illustrated in FIG. 2(a) is stored.

Compared with the memory command illustrated in FIG. 2(a), the memory command illustrated in FIG. 2(b) may include only one operation target address (ADD1), and may further include the operation code (ALU2) for generating another operation target address (ADD2).

Therefore, if the memory controller 200 receives the memory command (M_CMD) illustrated in FIG. 2(a), the memory controller 200 may generate only a new destination operation address using the first operation code (ALU1). If the memory controller 200 receives the memory command (M_CMD) illustrated in FIG. 2(b), the memory controller 200 may generate not only a destination operation address but also a new operation target address (ADD2).

Figure 3:
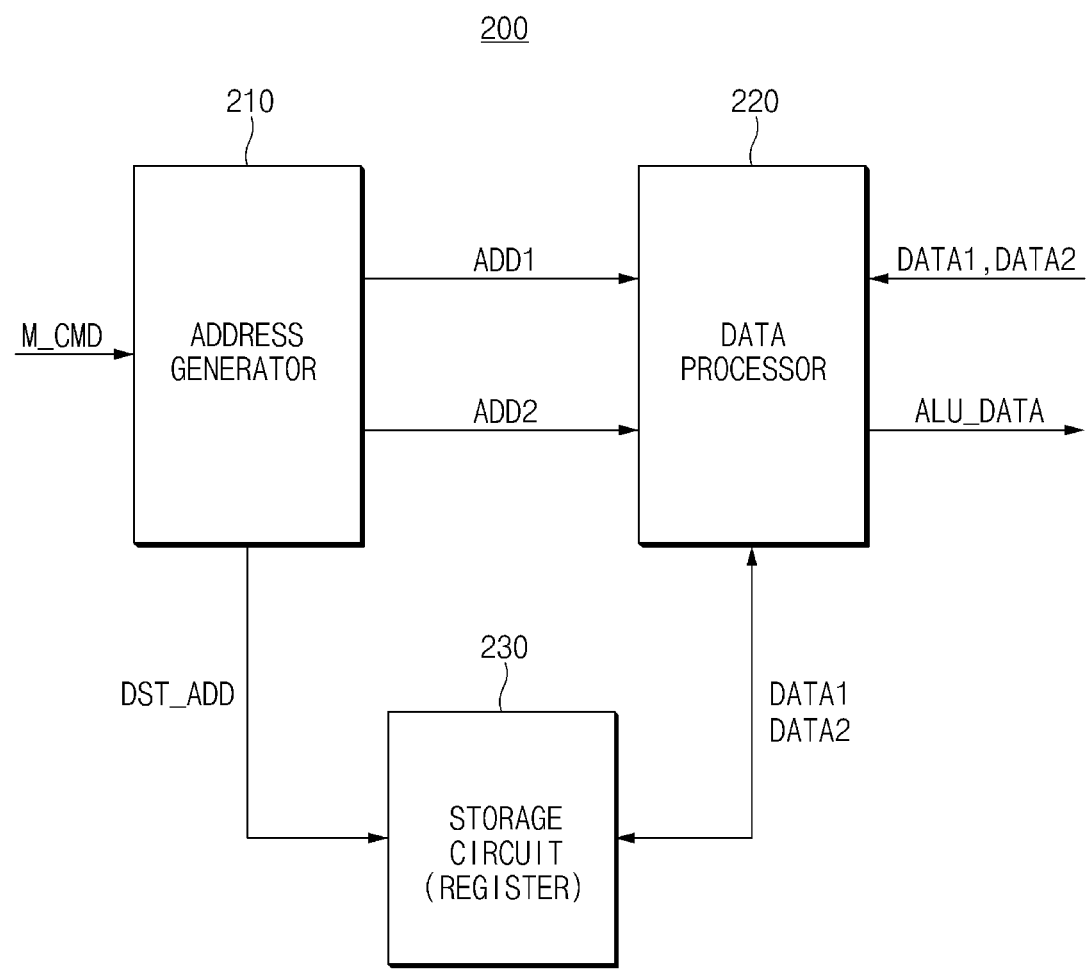
FIG. 3 is a block diagram illustrating a representation of an example of a memory controller illustrated in FIG. 1.

FIG. 3 is a block diagram illustrating a representation of an example of the memory controller 200 illustrated in FIG. 1.

Referring to FIG. 3, the memory controller 200 may include an address generator 210, a data processor 220, and a storage circuit 230.

The address generator 210 may output an operation target address (ADD2) and a destination address (DST_ADD) in response to the memory command (M_CMD) received from the host 100. If only one operation target address (for example, the first operation target address ADD1) is contained in the memory command (M_CMD), the address generator 210 may perform a logic operation of the first operation target address (ADD1) using the second operation code (ALU2), and may thus generate a new operation target address to be used as the second operation target address (ADD2). For example, the address generator 210 may generate a complement of the first operation target address (ADD1) as a new operation target address, or may generate a new operation target address by adding a specific number (e.g., "1") to the first operation target address (ADD1). The address generator 210 may transmit operation target addresses (ADD1, ADD2) to the data processor 220, such that the data processor 220 may read the operation target data (DATA1, DATA2) respectively stored at the corresponding addresses. In addition, the address generator 210 may generate the destination address (DST_ADD) using the two operation target addresses (ADD1, ADD2) and the operation code (ALU1), and may store the generated destination address (DST_ADD) in the storage circuit 230. In this case, the address generator 210 may use any one of two operation target addresses (ADD1, ADD2) as the destination address (DST_ADD), or may use a destination operation address obtained when the two operation target addresses (ADD1, ADD2) are operated in response to the operation code (ALU1), as the destination address (DST_ADD). For example, the address generator 210 may generate a higher one {max(ADD1, ADD2)} or a smaller one {min(ADD1, ADD2)} selected from among two operation target addresses (ADD1, ADD2) as a destination operation address, may generate the result (ADD1 XOR ADD2) of a logic XOR operation between two operation target addresses (ADD1, ADD2) as a destination operation address, or may generate the result of a logic OR operation between two operation target addresses (ADD1, ADD2) as a destination operation address.

Upon receiving the operation target addresses (ADD1, ADD2) from the address generator 210, the data processor 220 may read the operation target data (DATA1, DATA2) respectively stored in the operation target addresses (ADD1, ADD2) by accessing the memory 300, may perform a logic operation of the read operation target data (DATA1, DATA2), and may write operation resultant data (ALU_DATA) in the destination address (DST_ADD) of the memory 300.

The storage circuit 230 may temporarily store the destination address (DST_ADD) generated by the address generator 210 and the operation target data (DATA1, DATA2) read by the data processor 220.

Figure 4:
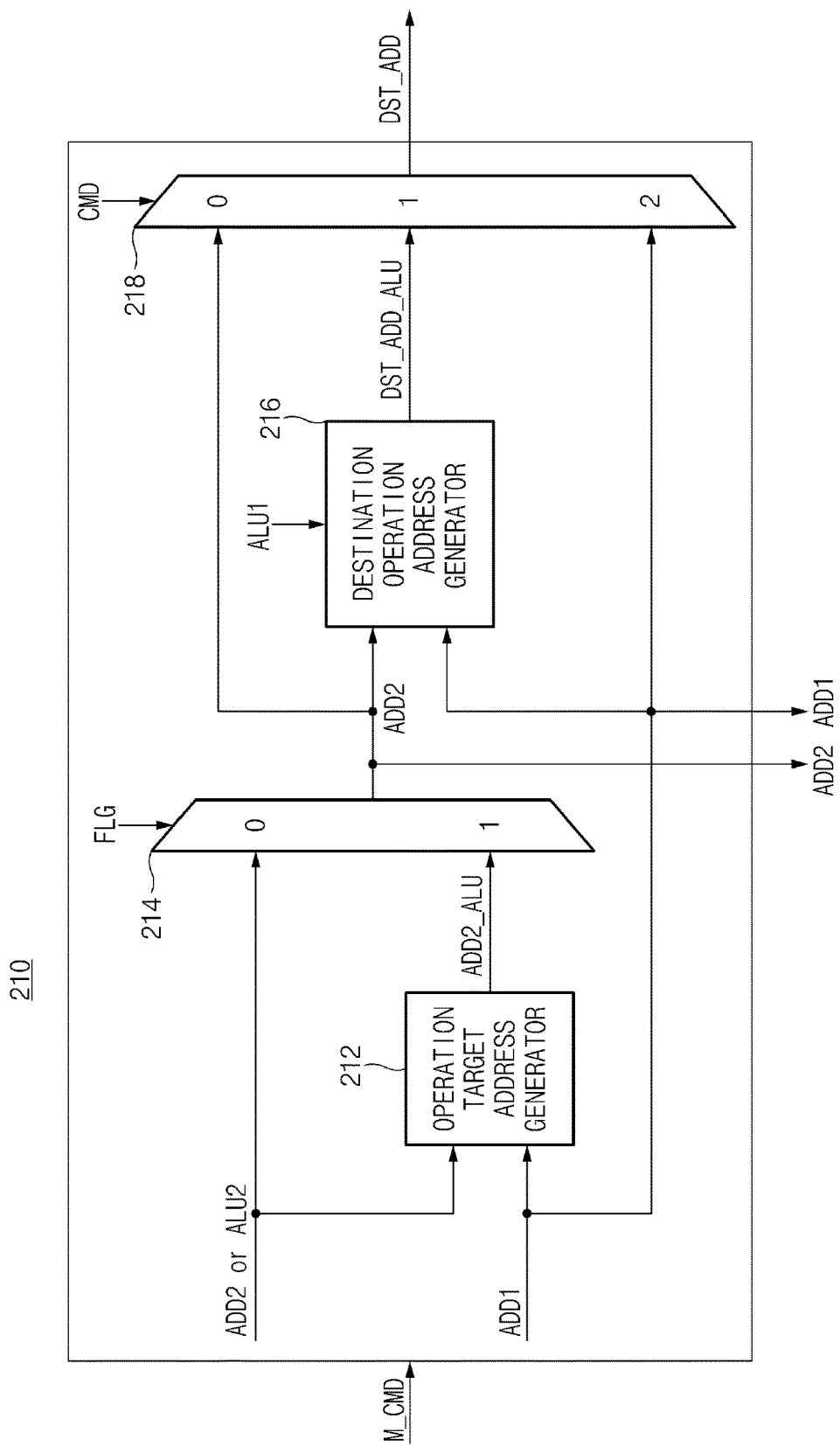
FIG. 4 is a block diagram illustrating a representation of an example of an address generator illustrated in FIG. 3.

FIG. 4 is a block diagram illustrating a representation of an example of the address generator 210 illustrated in FIG. 3.

Referring to FIG. 4, the address generator 210 may include an operation target address generator 212, a first multiplexer 214, a destination operation address generator 216, and a second multiplexer 218. The operation target address generator 212 may generate an operation target address (ADD2_ALU) using both the first operation target address (ADD1) and the operation code (ALU2) contained in the memory command (M_CMD) received from the host 100. That is, if only the first operation target address (ADD1) is contained in the memory command (M_CMD), the operation target address generator 212 may perform a logic operation of the first operation target address (ADD1) using the operation code (ALU2), and may thus generate a new operation target address (ADD2_ALU).

The first multiplexer 214 may output the second operation target address (ADD2) in response to a value of the flag (FLG). In this case, according to the flag (FLG) value, the first multiplexer 214 may selectively output any one of the second operation target address (ADD2) contained in the memory command (M_CMD) and the operation target address (ADD2_ALU) generated by the operation target address generator 212, as the second operation target address (ADD2). For example, if the flag (FLG) is set to zero "0", the first multiplexer 214 may output the second operation target address (ADD2) contained in the memory command (M_CMD). If the flag (FLG) is set to "1", the first multiplexer 214 may output the operation target address (ADD2_ALU) generated by the operation target address generator 212.

The destination operation address generator 216 may receive the first operation target address (ADD1) contained in the memory command (M_CMD), the second operation target address (ADD2) received from the first multiplexer 214, and the first operation code (ALU1), such that the destination operation address generator 216 may generate a destination operation address (DST_ADD_ALU) using the above three reception results (ADD1, ADD2, ALU1). The destination operation address generator 216 may perform operation between two operation target addresses (ADD1, ADD2) in response to the operation code (ALU1), and may thus generate the destination operation address (DST_ADD_ALU). For example, the destination operation address generator 216 may generate a higher one{max(ADD1, ADD2)} or a smaller one {min(ADD1, ADD2)} selected from among two operation target addresses (ADD1, ADD2) as a destination operation address (DST_ADD_ALU), may generate the result (ADD1 XOR ADD2) of a logic XOR operation between two operation target addresses (ADD1, ADD2) as a destination operation address (DST_ADD_ALU), or may generate the result of a logic OR operation between two operation target addresses (ADD1, ADD2) as a destination operation address (DST_ADD_ALU).

In response to the command code (CMD), the second multiplexer 218 may output any one of the first operation target address (ADD1) contained in the memory command (M_CMD), the second operation target address (ADD2) generated by the multiplexer 214, and the destination address (DST_ADD_ALU) generated by the destination operation address generator 216, as the destination address (DST_ADD). For example, if the command code (CMD) is set to "0(00)", the second multiplexer 218 may output the second operation target address (ADD2) as the destination address (DST_ADD). If the command code (CMD) is set to "1(01)", the second multiplexer 218 may output the destination operation address (DST_ADD_ALU) as the destination address (DST_ADD). If the command code (CMD) is set to "2(10)", the second multiplexer 218 may output the first operation target address (ADD1) as the destination address (DST_ADD).

Figure 5:
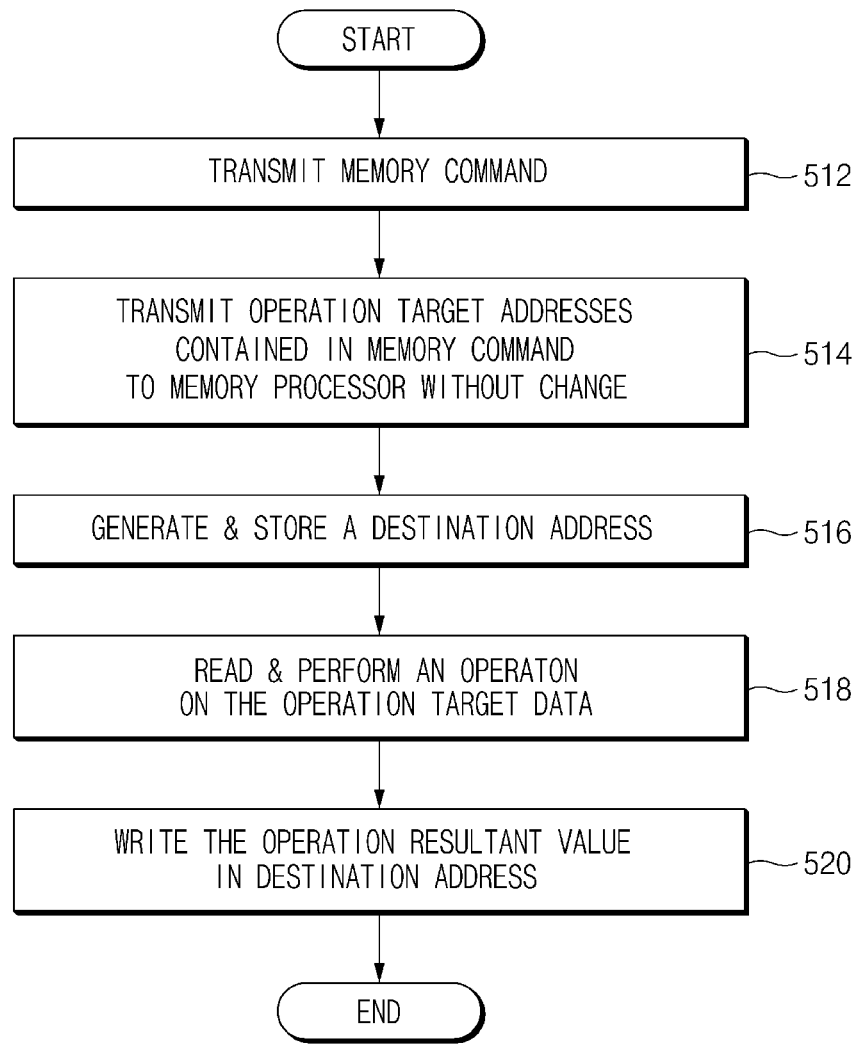
FIG. 5 is a flowchart illustrating a representation of an example of a method for processing data according to an embodiment of the present disclosure.

FIG. 5 is a flowchart illustrating a representation of an example of a method for processing data according to an embodiment of the present disclosure. Referring to FIG. 5, it may be assumed, for example, that all the operation target addresses (ADD1, ADD2) are contained in the memory command.

The host 100 may generate a memory command for requesting that operation (e.g., addition) of data stored in the memory 300 be performed and the operation resultant data be re-stored in the memory 300, and may transmit the generated memory command to the memory controller 200 (Step 512).

In this case, the host 100 may include two operation target addresses (ADD1, ADD2) respectively indicating the positions of operation target data in the memory command, and may transmit the resultant memory command. In addition, if, for example, all the operation target addresses (ADD1, ADD2) are contained in the memory command as described above, the host 100 may determine the flag of the memory command to be zero "0".

The address generator 210 of the memory controller 200 having received the memory command may transmit the operation target addresses (ADD1, ADD2) contained in the received memory command to the data processor 220 (Step 514).

That is, as illustrated in FIG. 4, the operation target address generator 212 may not generate a new address because the second operation code (ALU2) is not present in the memory command, and may output the second address (ADD2) contained in the memory command without change because the flag is set to zero "0", such that two operation target addresses (ADD1, ADD2) contained in the memory command are transmitted to the data processor 220.

The address generator 210 may generate a destination address (DST_ADD), and may store the generated destination address (DST_ADD) in the storage circuit 230 (Step 516).

That is, as illustrated in FIG. 4, the destination operation address generator 216 may perform a logic operation between the first operation target address (ADD1) and the second operation target address (ADD2) in response to a first operation code (ALU1), and may thus generate a destination operation address (DST_ADD_ALU). In response to the command code (CMD), the second multiplexer 218 may output any one of the first operation target address (ADD1), the second operation target address (ADD2), and the destination operation address (DST_ADD_ALU) generated by the destination operation address generator 216, as the destination address (DST_ADD). In this case, the command code (CMD) may be determined by the host 100.

In this case, the destination operation address generator 216 may generate a higher one {max(ADD1, ADD2)} or a smaller one {min(ADD1, ADD2)} selected from among two operation target addresses (ADD1, ADD2) as a new destination operation address (DST_ADD_ALU), may generate the result (ADD1 XOR ADD2) of a logic XOR operation between two operation target addresses (ADD1, ADD2) as a new destination operation address (DST_ADD_ALU), or may generate the result of a logic OR operation between two operation target addresses (ADD1, ADD2) as a new destination operation address (DST_ADD_ALU).

The data processor 220 having received the operation target addresses (ADD1, ADD2) may sequentially access the corresponding addresses (ADD1, ADD2) of the memory 300, read the corresponding operation target data, and store the read data in the storage circuit 230 (i.e., register). The data processor 220 may perform a logic operation (i.e., addition) on the stored read data (Step 518).

If such operation is completed in step 518, the data processor 220 may read the destination address (DST_ADD) stored in the storage circuit 230, and may access the read destination address of the memory 300, such that the operation result is stored (written) in the corresponding position (Step 520).

Figure 6:
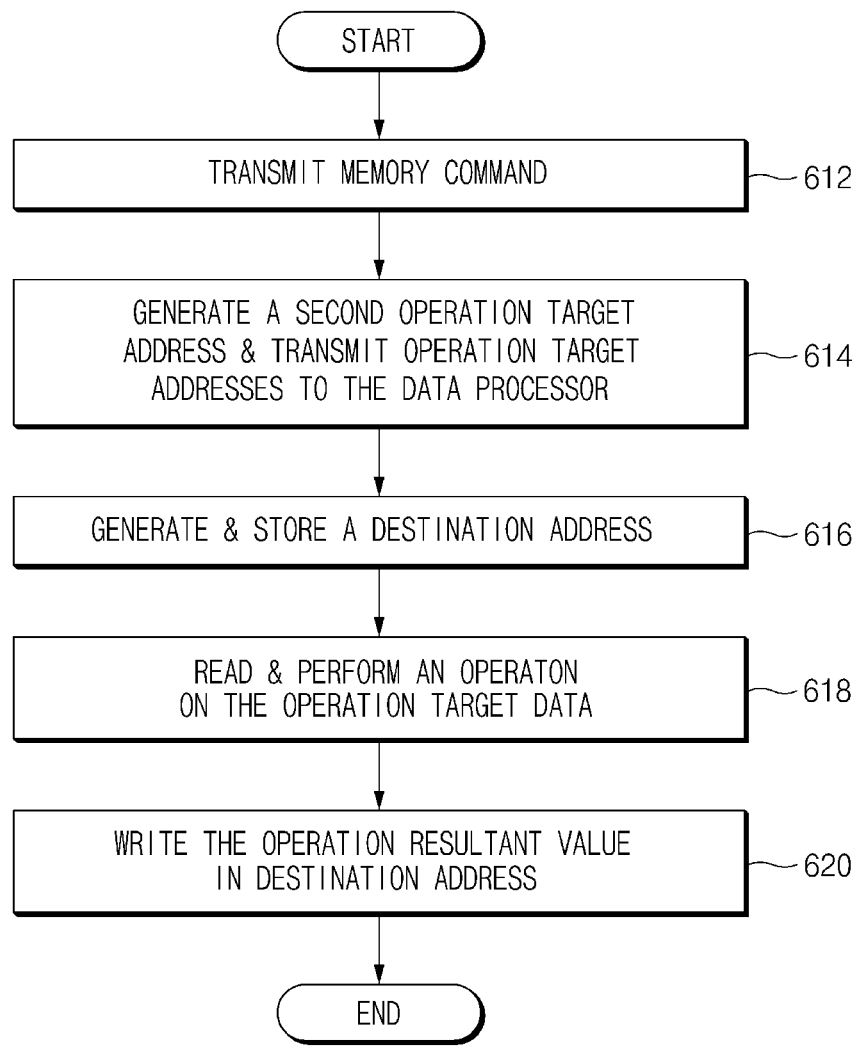
FIG. 6 is a flowchart illustrating a representation of an example of a method for processing data according to an embodiment of the present disclosure.

FIG. 6 is a flowchart illustrating a representation of an example of a method for processing data according to an embodiment of the present disclosure. Referring to FIG. 6, it may be assumed, for example, that only one (ADD1) of the operation target addresses (ADD1, ADD2) is contained in the memory command.

The host 100 may generate a memory command for requesting that an operation (e.g., addition) on data stored in the memory 300 be performed and the operation resultant data be re-stored in the memory 300, and may transmit the generated memory command to the memory controller 200 (Step 612).

In this case, the host 100 may include only one of two operation target addresses (ADD1, ADD2) respectively indicating the positions of operation target data in the memory command, and may transmit the resultant memory command. In addition, if only one operation target address (ADD1) is contained in the memory command as described above, the host 100 may include the second operation code (ALU2) in the memory command, and may determine the flag to be "1".

The memory generator 210 of the memory controller 200 having received the memory command may perform a logic operation of the first operation target address (ADD1) in response to the second operation code (ALU2), may generate the second operation target address (ADD2), and may transmit the operation target address (ADD1) and the second operation target address (ADD2) to the data processor 220 (Step 614).

That is, as illustrated in FIG. 4, upon receiving the first operation target address (ADD1) and the second operation code (ALU2), the operation target address generator 212 may perform a logic operation of the first operation target address (ADD1) in response to the second operation code (ALU2), may generate a new address (ADD2_ALU), and may output the new address (ADD2_ALU) to the first multiplexer 214. Since the flag is set to "1", the first multiplexer 214 may output the address (ADD2_ALU) generated by the operation target address generator 212, as the second operation target address (ADD2).

In this case, the operation target address generator 212 may generate a complement of the first operation target address (ADD1) as a new address (ADD2_ALU), or may generate a new address (ADD_ALU) by adding a specific number (e.g., "1") to the first operation target address (ADD1).

The address generator 210 may generate a destination address (DST_ADD), and may store the generated destination address (DST_ADD) in the storage circuit 230 (Step 616).

That is, as illustrated in FIG. 4, the destination operation address generator 216 may perform a logic operation between the first operation target address (ADD1) and the second operation target address (ADD2) in response to the first operation code (ALU1), and may thus generate a destination operation address (DST_ADD_ALU). In response to the command code (CMD), the second multiplexer 218 may output any one of the first operation target address (ADD1), the second operation target address (ADD2), and the destination operation address (DST_ADD_ALU) generated by the destination operation address generator 216, as the destination address (DST_ADD).

The data processor 220 having received the operation target addresses (ADD1, ADD2) may sequentially access the corresponding addresses (ADD1, ADD2) of the memory 300, may read the corresponding operation target data, and may store the read data in the storage circuit 230. The data processor 220 may perform a logic operation (e.g., addition) on the stored read data (Step 618).

If such operation is completed in step 618, the data processor 220 may access the destination address (DST_ADD) stored in the storage circuit 230, and may store (or write) the operation result at the corresponding position in the memory 300 (Step 620).

As is apparent from the above descriptions, the embodiments of the present disclosure may minimize the number of commands needed to perform a logic operation (or calculation) on data stored in a memory, such that load of a host is reduced and performance of a data storage apparatus is improved.

Those skilled in the art will appreciate that embodiments of the present disclosure may be carried out in other ways than those set forth herein without departing from the spirit and essential characteristics of these embodiments. The above embodiments are therefore to be construed in all aspects as illustrative and not restrictive.

The above embodiments of the present disclosure are illustrative and not limitative. Various alternatives and equivalents are possible. For example, the present disclosure may be implemented in a dynamic random access memory (DRAM) device or nonvolatile memory device. Other additions, subtractions, or modifications are obvious in view of the present disclosure and are intended to fall within the scope of the appended claims.

What is claimed is:

1. A memory controller comprising:
   an address generator configured to output a first operation target address, a second operation target address and a destination address based on a memory command; and
   a data processor configured to read data by accessing the first operation target address and the second operation target address of the memory, perform an operation on the read data, access the destination address, and write a result of the operation in the accessed destination address,
   wherein the address generator output a first address contained in the memory command as the first operation target address, and
   wherein the address generator selectively generates the second operation target address depending on whether a second address is contained in the memory command,
   wherein the address generator includes:
   an operation target address generator configured to generate a third address using the first address and a second operation code contained in the memory command;
   a first multiplexer configured to select any one of the third address and the second address contained in the memory command based on a flag contained in the memory command, and output the selected address as the second operation target address;
   a destination operation address generator configured to generate a destination operation-address by performing a logic operation between the first address and the output address of the first multiplexer based on a first operation code contained in the memory command; and
   a second multiplexer configured to select any one of the first address, the output address of the first multiplexer, and the destination operation address, and output the selected address as the destination address.

2. The memory controller according to claim 1, wherein: the address generator is configured to, if the second address is contained in the memory command, output the second address to the data processor without change, as the second operation target address.

3. The memory controller according to claim 2, wherein the address generator is configured to output any one of the first operation target address, the second operation target address, and a destination operation address obtained by a logic operation between the first operation target address and the second operation target address, as the destination address.

4. The memory controller according to claim 1, wherein: the address generator is configured to, if the second address is not contained in the memory command, generate a new operation target address by performing a logic operation with the first operation target address based on a second operation code contained in the memory command, as the second operation target address.

5. The memory controller according to claim 4, wherein the address generator is configured to generate a complement of the first operation target address or an operation result value obtained by adding a specific number to the first operation target address, as the second operation target address.

6. The memory controller according to claim 1, wherein the destination operation address generator is configured to output any one of the first address and the output address of the first multiplexer, or output a sum or logic XOR of the first address and the output address of the first multiplexer.

7. The memory controller according to claim 1, further comprising:
   a storage circuit configured to temporarily store data read by the data processor and the destination address generated by the address generator.

8. The memory controller according to claim 7, wherein: if operation of the read data is completed, the data processor is configured to read the destination address stored in the storage circuit, access a corresponding address of a memory, and write a result of the operation with the corresponding address.

9. A data storage apparatus comprising:
   a host configured to output a memory command for requesting that an operation on data stored in a memory be performed and a resultant value of the operation be stored in the memory; and
   a memory controller configured to read operation target data stored in the memory upon receiving the memory command from the host, perform an operation on the read operation target data, and store a result of the operation in a destination address of the memory,
   wherein the memory controller comprises
   an address generator configured to output a first operation target address, a second operation target address and a destination address based on a memory command from the host; and
   a data processor configured to read data by accessing the first operation target address and the second operation target address of the memory, perform an operation on the read data, access the destination address, and write a result of the operation in the accessed destination address,
   wherein the address generator output a first address contained in the memory command as the first operation target address, and
   wherein the address generator selectively generates the second operation target address depending on whether a second address is contained in the memory command,
   wherein the address generator includes:
   an operation target address generator configured to generate a third address using the first address and a second operation code contained in the memory command;

a first multiplexer configured to select any one of the third address and the second address contained in the memory command based on a flag contained in the memory command, and output the selected address as the second operation target address;

a destination operation address generator configured to generate a destination operation address by performing a logic operation between the first address and the output address of the first multiplexer based on a first operation code contained in the memory command; and a second multiplexer configured to select any one of the first address, the output address of the first multiplexer, and the destination operation address, and output the selected address as the destination address.

10. The data storage apparatus according to claim 9, wherein the host is configured to include an operation target address indicating at least one position of the operation target data, and an operation code for generating a new address using the operation target address in the memory command.

11. The data storage apparatus according to claim 10, wherein the host is configured to include the first address and the second address respectively indicating positions of two operation target data, and a first operation code for performing an operation between the first address and the second address in the memory command.

12. The data storage circuit apparatus according to claim 11, wherein the memory controller is configured to output any one of the first address, the second address, and a destination operation address obtained when the operation between the first address and the second address is performed based on the first operation code, as the destination address.

13. The data storage apparatus according to claim 10, wherein the host is configured to include a first address indicating a position of any one of two operation target data, a second operation code for performing operation of the first address, and a first operation code for performing operation between the first address and the second address in the memory command.

14. The data storage apparatus according to claim 13, wherein the memory controller is configured to output any one of the first address, a second address obtained when the first address is operated based on the second operation code, and a destination operation address obtained when the first address and the second address are operated based on the first operation code, as the destination address.

* * * * *